(12) United States Patent
Kao et al.

(10) Patent No.: US 7,906,945 B2
(45) Date of Patent: Mar. 15, 2011

(54) SOFT-START VOLTAGE CIRCUIT

(75) Inventors: Shun-Hau Kao, Taipei County (TW);
Mao-Chuan Chien, Taipei County (TW)

(73) Assignee: Advanced Analog Technology, Inc., Hsinchu (TW)

( * ) Notice: Subject to any disclaimer, the term of this patent is extended or adjusted under 35 U.S.C. 154(b) by 319 days.

(21) Appl. No.: 12/271,939

(22) Filed: Nov. 17, 2008

(65) Prior Publication Data
US 2010/0060248 A1    Mar. 11, 2010

(30) Foreign Application Priority Data

Sep. 10, 2008 (TW) .............................. 97134684 A (51) Int. Cl.
G05F 1/10 (2006.01)
H02M 7/10 (2006.01)
(52) U.S. Cl. ..................... 323/238; 323/901; 363/49
(58) Field of Classification Search .................. 323/238, 323/280, 284, 901, 908; 363/49
See application file for complete search history.

(56) References Cited

U.S. PATENT DOCUMENTS

| | | | |
|---|---|---|---|
| 7,009,371 B2* | 3/2006 | Nakata | 323/282 |
| 7,075,804 B2* | 7/2006 | Shearon et al. | 363/49 |
| 7,151,360 B2* | 12/2006 | Kim et al. | 323/222 |
| 2005/0007167 A1* | 1/2005 | Tange | 327/172 |

* cited by examiner

*Primary Examiner* — Jessica Han
(74) *Attorney, Agent, or Firm* — Winston Hsu; Scott Margo (57) ABSTRACT

A soft-start voltage circuit includes an operational amplifier, a first and a second capacitors, a first and a second switches, and a voltage level shifter. The operational amplifier includes a positive end, a negative end, and an output end coupled to the negative end of the operational amplifier for outputting the soft-start voltage. The voltage level shifter is coupled between the first capacitor and the positive end of the operational amplifier for shifting a level of the voltage on the first capacitor. The first switch is coupled between the first and the second capacitors for coupling the first and the second capacitors according to the clock. The second switch is coupled between the second capacitor and the negative end of the operational amplifier for coupling the second capacitor and the negative end of the operational amplifier according to the inverted clock.

7 Claims, 7 Drawing Sheets

SOFT-START VOLTAGE CIRCUIT

BACKGROUND OF THE INVENTION

1. Field of the Invention

The present invention relates to a soft-start voltage circuit, and more particularly, to a soft-start voltage circuit for providing a soft-start voltage to a DC/DC converter.

2. Description of the Prior Art

Figure 1:
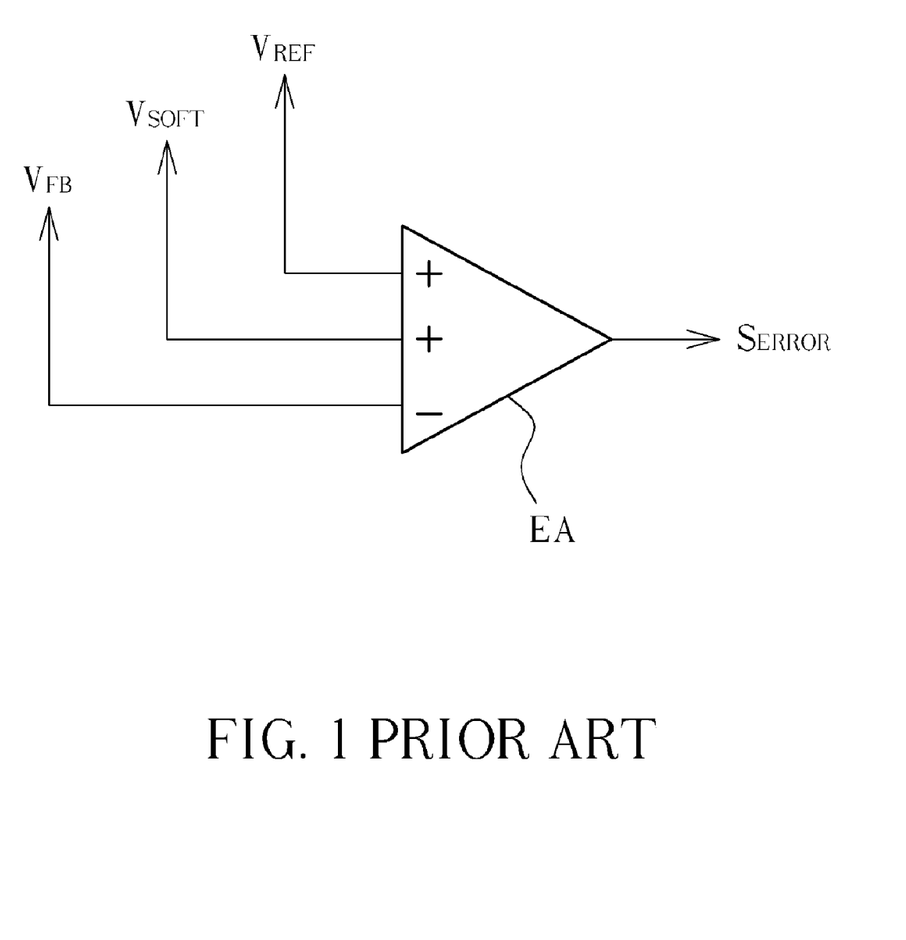
FIG. 1 is a diagram illustrating an error amplifier in a DC/DC converter.

Please refer to FIG. 1. FIG. 1 is a diagram illustrating an error amplifier EA in a DC/DC converter. The error amplifier EA is utilized to compare a feedback voltage $V_{FB}$ from an output voltage $V_{OUT}$ of the DC/DC converter with a reference voltage $V_{REF}$ or a soft-start voltage $V_{SOFT}$ for generating an error signal $S_{ERROR}$ to adjust the level of the output voltage $V_{OUT}$ of the DC/DC converter as desired.

Generally speaking, at the start phase of a DC/DC converter, the output voltage $V_{OUT}$ of the DC/DC converter is still at a very low level. As a result, if the error amplifier EA compares the feedback voltage $V_{FB}$ from the output voltage $V_{OUT}$ with the reference voltage $V_{REF}$ at the time, the gain of the error signal $S_{ERROR}$ generated by the error amplifier EA is relatively high. In such condition, the DC/DC converter generates a current with a very large magnitude, which is so called inrush current, for raising the output voltage $V_{OUT}$ to the required voltage level. In this way, the inrush current may affect the voltage level of the input voltage source of the DC/DC converter. Thus, at the start phase of the DC/DC converter, the error amplifier EA compares the feedback voltage $V_{FB}$ from the output voltage $V_{OUT}$ with the soft-start voltage $V_{SOFT}$. In this way, the gain of the error signal $S_{ERROR}$ generated by the error amplifier EA is not too high so as to reduce the inrush current of the DC/DC converter and therefore the voltage level of the input voltage source of DC/DC converter at the start phase of the DC/DC converter is not lowered.

Figure 2:
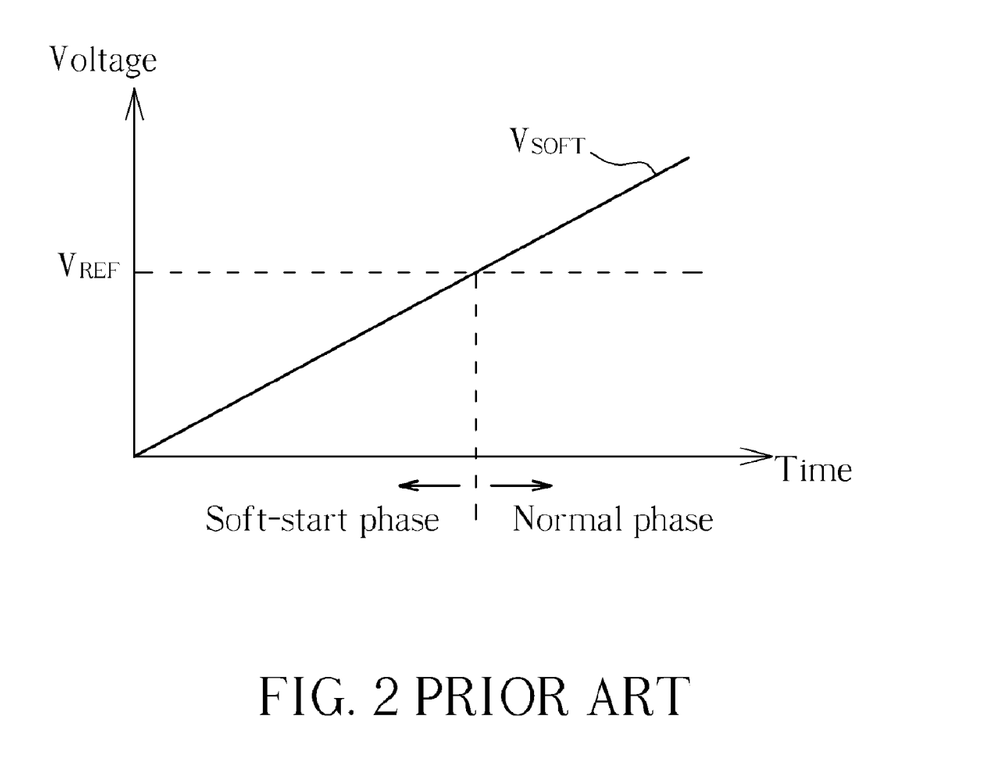
FIG. 2 is a diagram illustrating the relationship between the soft-start voltage and the reference voltage.

Please refer to FIG. 2. FIG. 2 is a diagram illustrating the relationship between the soft-start voltage and the reference voltage. For the soft-start voltage having the characteristics described above, the soft-start voltage must be a voltage which rises gradually. When the soft-start voltage $V_{SOFT}$ is lower than the reference voltage $V_{REF}$, which is so called the soft-start phase of the DC/DC converter, the error amplifier EA compares the feedback voltage $V_{FB}$ with the soft-start voltage $V_{SOFT}$ for generating the error signal $S_{ERROR}$. When the soft-start voltage $V_{SOFT}$ is higher than the reference voltage $V_{REF}$, which is so called the normal phase of the DC/DC converter, the error amplifier EA compares the feedback voltage $V_{FB}$ with the reference voltage $V_{REF}$ for generating error signal $S_{ERROR}$. For having a longer soft-start phase, the slope of the soft-start voltage $V_{SOFT}$ when the soft-start voltage $V_{SOFT}$ rises must be flatter. That is, the more gradually the soft-start voltage $V_{SOFT}$ rises, the longer the start phase is, and the smaller the load current drained from the output voltage source $V_{OUT}$ is. However, for realizing the characteristic of the soft-start voltage $V_{SOFT}$ to rise gradually, generally it is achieved by a capacitor with relative large capacitance or a charge current with relative small magnitude.

Figure 3:
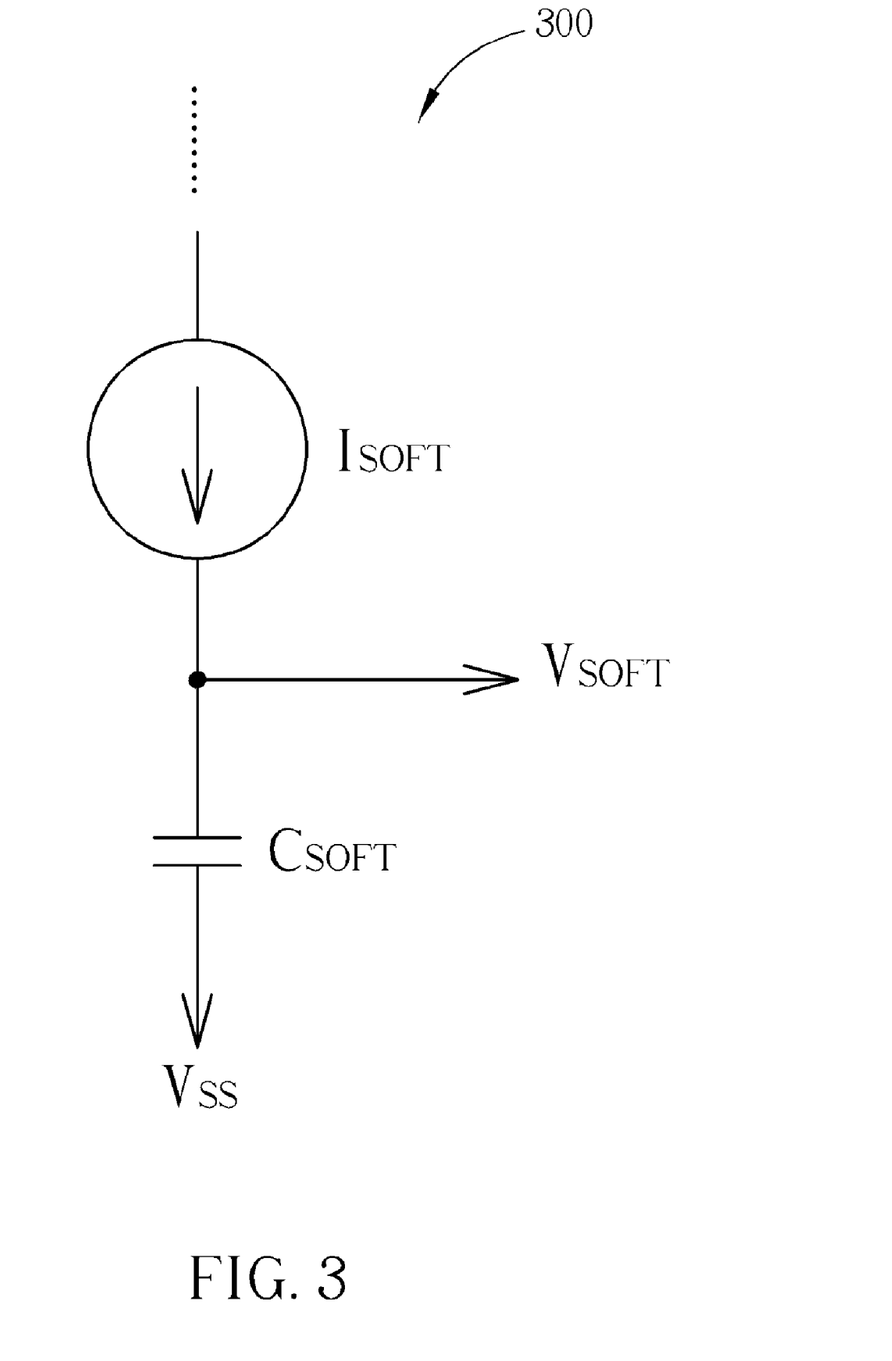
FIG. 3 is a diagram illustrating the conventional soft-start voltage circuit.

Please refer to FIG. 3. FIG. 3 is a diagram illustrating the conventional soft-start voltage circuit 300. As shown in FIG. 3, the soft-start voltage circuit 300 comprises a capacitor $C_{SOFT}$ and a current source $I_{SOFT}$. The voltage over the capacitor $C_{SOFT}$ is served as the soft-start voltage $V_{SOFT}$. As described in the previous paragraph, in the soft-start voltage circuit 300, it is required that the capacitance of the capacitor $C_{SOFT}$ is large enough or the current provided by the current source $I_{SOFT}$ is small enough for providing a gradually rising soft-start voltage $V_{SOFT}$ to prolong the start phase. However, the capacitor $C_{SOFT}$ occupies a quite large area in a general chip. Thus, utilizing the capacitor $C_{SOFT}$ with the large capacitance to realize the soft-start voltage circuit 300 wastes a substantial area. Moreover, when the current source $I_{SOFT}$ provides a small enough current, the current source $I_{SOFT}$ is easily affected by the fabrication so that the current provided by the current source $I_{SOFT}$ is not as the same as expected. In other words, the period of the soft-start phase is affected and not as expected. Therefore, regardless of adjusting values of the capacitor $C_{SOFT}$ or the current source $I_{SOFT}$, it is quite inconvenient for the user.

SUMMARY OF THE INVENTION

The present invention provides a soft-start voltage circuit. The soft-start voltage circuit comprises an operational amplifier, a first capacitor, a voltage level shifter, a second capacitor, a first switch, and a second switch. The operational amplifier comprises a positive input end, a negative input end, and an output end, coupled to the negative input end of the operational amplifier, for outputting a soft-start voltage. The voltage level shifter is coupled between the first capacitor and the positive input end of the operational amplifier for shifting a voltage on the first capacitor with an offset voltage. The first switch is coupled between the first and the second capacitors for coupling the first and the second capacitors according to a clock signal. The second switch is coupled between the second capacitor and the negative input end of the operational amplifier for coupling the second capacitor and the negative input end of the operational amplifier according to an inverted signal corresponding to the clock signal.

These and other objectives of the present invention will no doubt become obvious to those of ordinary skill in the art after reading the following detailed description of the preferred embodiment that is illustrated in the various figures and drawings.

DETAILED DESCRIPTION

Figure 4:
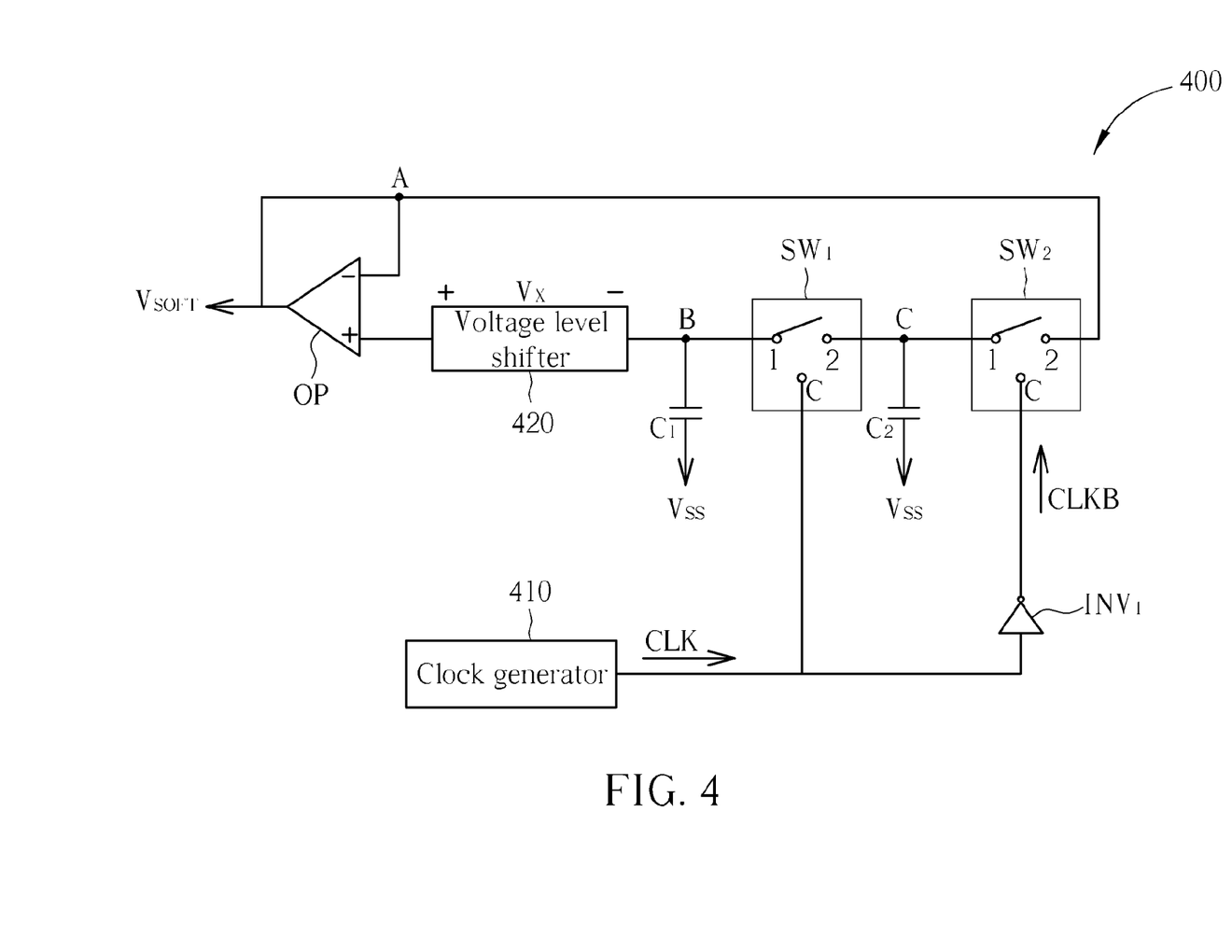
FIG. 4 is a diagram illustrating the soft-start voltage circuit of the present invention.

Please refer to FIG. 4. FIG. 4 is a diagram illustrating the soft-start voltage circuit 400 of the present invention. The soft-start voltage circuit 400 is utilized during the soft-start phase of the DC/DC converter for providing a gradually rising soft-start voltage $V_{SOFT}$ to the error amplifier EA as shown in FIG. 1. The soft-start voltage circuit 400 comprises an operational amplifier OP, a clock generator 410, a voltage level shifter 420, an inverter $INV_1$, two switches $SW_1$ and $SW_2$, and two capacitors $C_1$ and $C_2$.

The clock generator 410 is utilized for generating a clock signal CLK. The inverter $INV_1$ is coupled to the clock generator 410 for inverting the clock signal CLK and generating a clock signal CLKB accordingly.

The voltage level shifter 420 is coupled between the positive input end of the operational amplifier OP and the capacitor $C_1$ (the node B) for shifting the received voltage with an offset voltage $V_X$ and outputting the shifted voltage. More particularly, when the voltage on the node B is $V_1$, the positive input end of the operational amplifier OP receives a voltage with the magnitude $(V_1+V_X)$, which is shifted by the voltage level shifter 420.

The positive input end of the operational amplifier OP is coupled to the voltage level shifter 420. The negative input end of the operational amplifier OP (the node A) is coupled between the output end of the operational amplifier OP and the second end 2 of the switch $SW_2$. The output end of the operational amplifier OP is utilized to output the soft-start voltage $V_{SOFT}$.

The capacitor $C_1$ is coupled between voltage level shifter 420, the first end 1 of the switch $SW_1$ (the node B), and the voltage source $V_{SS}$ (ground end). The capacitor $C_2$ is coupled between the second end 2 of the switch $SW_1$, the first end 1 of the switch $SW_2$ (the node C), and the voltage source $V_{SS}$ (the ground end). In the following description, the capacitances of $C_1$ and $C_2$ are assumed equal for calculating conveniently.

Both of the switches $SW_1$ and $SW_2$ comprise a first end 1, a second end 2, and a control end C. The first end of the switch $SW_1$ is coupled to the node B. The second end of the switch $SW_1$ is coupled to the node C. The control end C of the switch $SW_1$ is coupled to the clock generator 410 for receiving the clock signal CLK. The first end 1 of the switch $SW_2$ is coupled to the node C. The second end 2 of the switch $SW_2$ is coupled to the node A (the negative input end of the operational amplifier OP). The control end of the switch $SW_2$ is coupled to the inverter $INV_1$ for receiving the clock signal CLKB (the inverted clock signal CLK). When the control end C of the switch $SW_1$ receives the control signal with logic "1", the switch $SW_1$ is turned on, which means that the switch $SW_1$ couples the first end 1 of the switch $SW_1$ to the second end 2 of the switch $SW_1$. On the contrary, when the control end C of the switch $SW_1$ receives the control signal with logic "0", the switch $SW_1$ is turned off, which means that the switch $SW_1$ disconnects the first end 1 of the switch $SW_1$ from the second end 2 of the switch $SW_1$. The operation principle of the switch $SW_2$ is the same as the switch $SW_1$, and the related description is not repeated again. Furthermore, both of the switches $SW_1$ and $SW_2$ can be realized with P channel Metal Oxide Semiconductor (PMOS) transistors, and the control ends C of the switches $SW_1$ and $SW_2$ are the gates of the PMOS transistors.

The operating principle of the soft-start voltage circuit 400 is described in detail as below.

Figure 5:
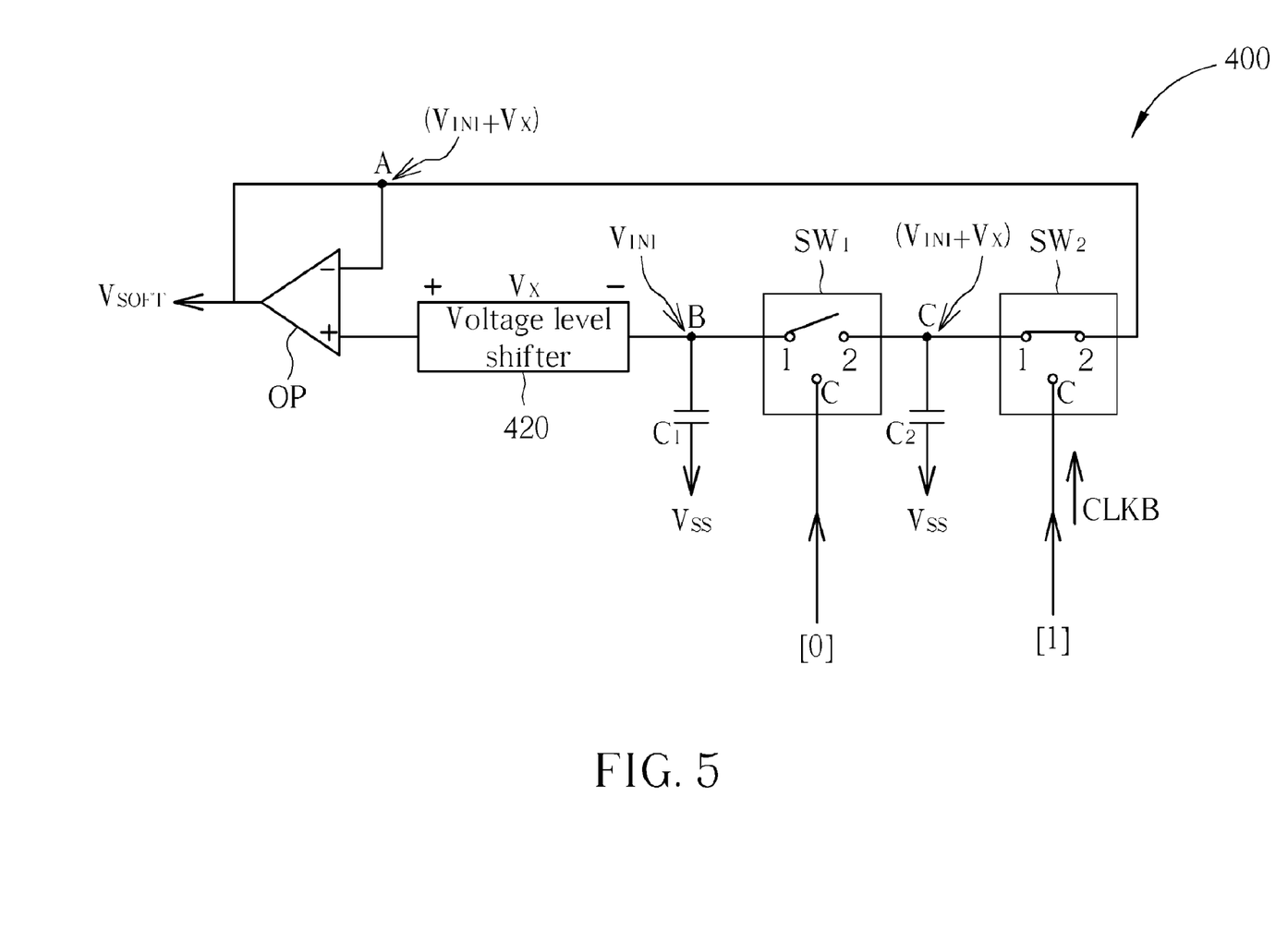
FIG. 5 is a diagram illustrating the operation of the soft-start voltage circuit.

Please refer to FIG. 5. FIG. 5 is a diagram illustrating the operation of the soft-start voltage circuit 400. As shown in FIG. 5, when the clock generator 410 is turned on, the clock generator 410 first generates a clock signal CLK with a low voltage level (logic "0") for the first half cycle, and a clock signal CLKB with a high voltage level (logic "1") so that the switch $SW_1$ is turned off and the switch $SW_2$ is turned on. Meanwhile, assuming an initial voltage $V_{INI}$ exists (please note that the initial voltage $V_{INI}$ can be 0 volt), the voltage $V_A$ on the node A equals to $(V_{INI}+V_X)$. That is, the soft-start voltage $V_{SOFT}$ outputted from the operational amplifier OP equals to $(V_{INI}+V_X)$ at the time.

Figure 6:
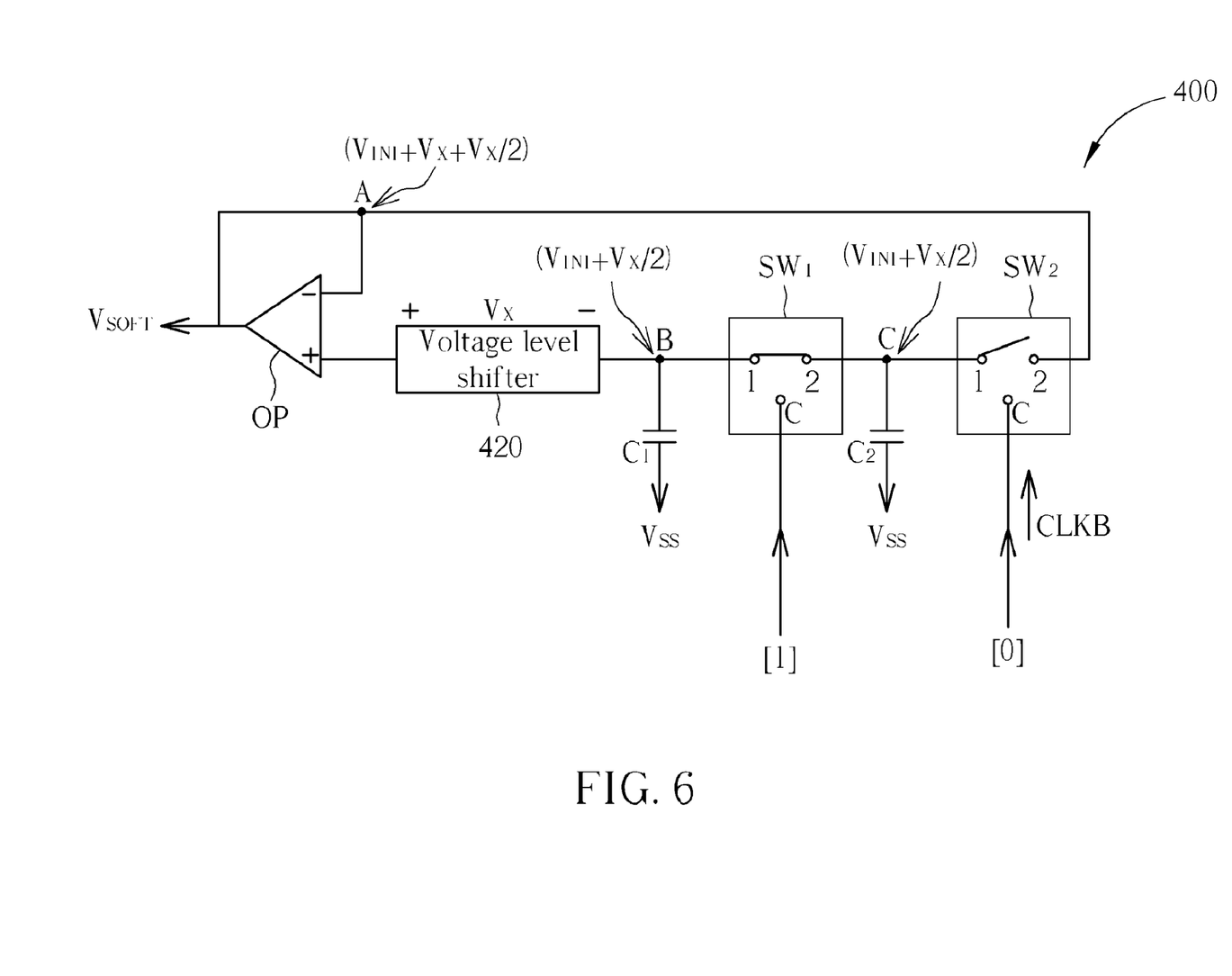
FIG. 6 is a diagram further illustrating the operation of the soft-start voltage circuit.

Please refer to FIG. 6. FIG. 6 is a diagram further illustrating the operation of the soft-start voltage circuit 400. As shown in FIG. 6, when the clock generator 410 is turned on for the first half cycle of the clock signal CLK, the clock generator 410 generates the clock signal CLK with a high voltage level (logic "1") for the second half cycle, and the clock signal CLKB with a low voltage level (logic "0") for the second half cycle so that the switch $SW_1$ is turned on and the switch $SW_2$ is turned off. Meanwhile, the former voltage $V_X$ on the node A is shared by the capacitors $C_1$ and $C_2$ evenly. Thus, both of the voltage $V_B$ on the node B and the voltage $V_C$ on the node C are raised up to $(V_{INI}+V_X/2)$. Consequently, the voltage of the positive input end of the operational amplifier OP is also raised up to $(V_{INI}+V_X+V_X/2)$ and the voltage $V_A$ on the node A is raised up to $(V_{INI}+V_X+V_X/2)$ as well. That is, the soft-start voltage $V_{SOFT}$ outputted from the soft-start circuit 400 is raised up to $(V_{INI}+V_X+V_X/2)$, which is higher than the soft-start voltage $V_{SOFT}$ during the first half cycle of the clock signal CLK by $V_X/2$.

From FIG. 5 and FIG. 6, it is known that by means of the operation of the clock generator 410 and the voltage level shifter 420, the soft-start voltage $V_{SOFT}$ is raised up with a voltage $V_X/2$ each half cycle of the clock signal CLK so as to raise the soft-start voltage $V_{SOFT}$ gradually. In addition, by controlling the frequency of the clock signal CLK generated from the clock generator 410 and the offset voltage $V_X$ generated from the voltage level shifter 420, the slope of the soft-start voltage $V_{SOFT}$ can be controlled effectively and the period of the soft-start phase can be precisely controlled as well.

Figure 7:
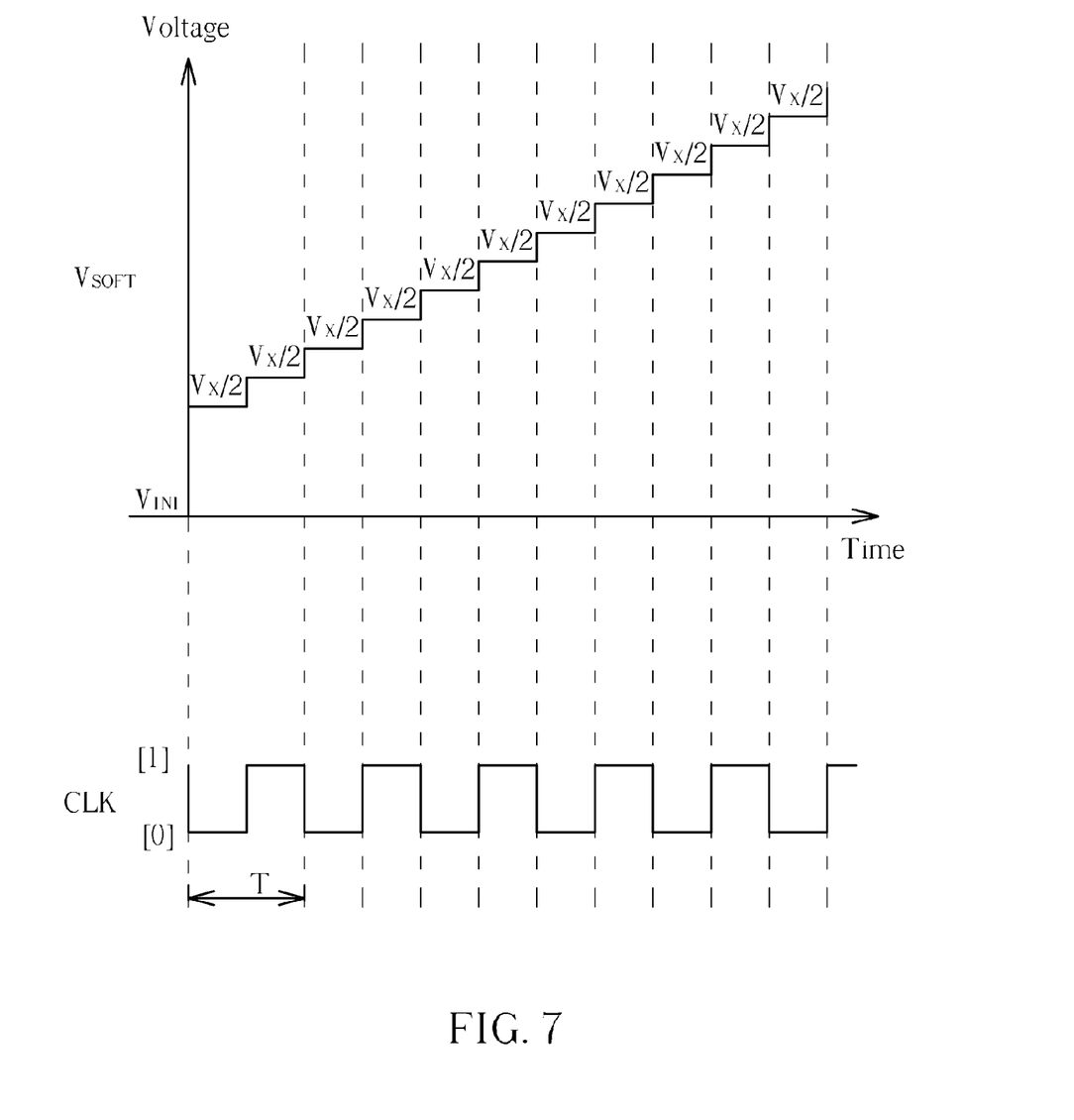
FIG. 7 is a timing diagram illustrating the relationship between the clock signal, the offset voltage, and the soft-start voltage.

Please refer to FIG. 7. FIG. 7 is a timing diagram illustrating the relationship between the clock signal CLK, the offset voltage $V_X$, and the soft-start voltage $V_{SOFT}$. As shown in FIG. 7, every half cycle of the clock signal CLK, the soft-start voltage $V_{SOFT}$ rises with a voltage $V_X/2$. That is, each cycle T passes, the soft-start voltage $V_{SOFT}$ rises with an offset voltage $V_X$. Thus, it can be seen in FIG. 7 that the slope of the soft-start voltage $V_{SOFT}$ can be exactly controlled by the cycle of the clock signal CLK and the offset voltage, which allows users to exactly control the period of the soft-start phase.

In conclusion, the soft-start voltage circuit provided by the present invention can generate the soft-start voltage without the large capacitor or the small current. Therefore, the area consumed in the chip can be saved. Furthermore, in the present invention, the slope of the soft-start voltage $V_{SOFT}$ can be controlled by the clock signal and the offset voltage. Thus, it provides a great convenience for the user to utilize the soft-start voltage circuit provided by the present invention for exactly controlling the period of the soft-start phase.

Those skilled in the art will readily observe that numerous modifications and alterations of the device and method may be made while retaining the teachings of the invention.

What is claimed is:

1. A soft-start voltage circuit, comprising:
   an operational amplifier, comprising:
      a positive input end;
      a negative input end; and
      an output end, coupled to the negative input end of the operational amplifier, for outputting a soft-start voltage;
   a first capacitor;
   a voltage level shifter, coupled between the first capacitor and the positive input end of the operational amplifier, for shifting a voltage on the first capacitor with an offset voltage;
   a second capacitor;
   a first switch, coupled between the first and the second capacitors, for coupling the first and the second capacitors according to a clock signal; and a second switch, coupled between the second capacitor and the negative input end of the operational amplifier, for coupling the second capacitor and the negative input end of the operational amplifier according to an inverted signal corresponding to the clock signal.

2. The soft-start voltage circuit of claim 1, wherein the first switch comprises:
a first end, coupled to the first capacitor;
a second end, coupled to the second capacitor; and
a control end, for receiving the clock signal;
wherein when the clock signal is at a low voltage level, the first end of the first switch is coupled to the second end of the first switch;
wherein when the clock signal is at a high voltage level, the first end of the first switch is not coupled to the second end of the first switch.

3. The soft-start voltage circuit of claim 2, wherein the first switch is a P channel Metal Oxide Semiconductor (PMOS) transistor.

4. The soft-start voltage circuit of claim 1, wherein the second switch comprises:
a first end, coupled to the second capacitor;
a second end, coupled to the negative end of the operational amplifier; and
a control end, for receiving the inverted signal corresponding to the clock signal;
wherein when the inverted signal corresponding to the clock signal is at a low voltage level, the first end of the second switch is coupled to the second end of the second switch;
wherein when the inverted signal corresponding to the clock signal is at a high voltage level, the first end of the second switch is not coupled to the second end of the second switch.

5. The soft-start voltage circuit of claim 3, wherein the second switch is a PMOS transistor.

6. The soft-start voltage circuit of claim 1, further comprising:
a clock generator, coupled to the control end of the first switch, for generating the clock signal; and
an inverter, coupled between the clock generator and the control end of the second switch, for generating the inverted signal corresponding to the clock signal.

7. The soft-start voltage circuit of claim 1, wherein the first capacitor and the second capacitor have the same capacitance.

* * * * *